United States Patent
Keller

(10) Patent No.: US 6,523,444 B2
(45) Date of Patent: Feb. 25, 2003

(54) METHOD FOR CUTTING AT LEAST ONE WORKPIECE SECTION WHICH MAY HAVE BEEN PRODUCED IN AN EXTRUSION PRESS

(76) Inventor: Christoph Keller, Im Steinisländle 2, 78234 Engen-Welschingen (DE)

( * ) Notice: Subject to any disclaimer, the term of this patent is extended or adjusted under 35 U.S.C. 154(b) by 0 days.

(21) Appl. No.: 09/965,035

(22) Filed: Sep. 26, 2001

(65) Prior Publication Data

US 2002/0007709 A1 Jan. 24, 2002

Related U.S. Application Data

(63) Continuation of application No. 09/281,724, filed on Mar. 30, 1999.

(30) Foreign Application Priority Data

Mar. 31, 1998 (DE) .......................... 198 14 345
Aug. 4, 1998 (DE) .......................... 198 35 138

(51) Int. Cl.$^7$ ............................. B27B 5/18; B26D 5/02; B26D 5/20; B26D 7/02
(52) U.S. Cl. ................... 83/13; 83/34; 83/42; 83/56; 83/282; 83/385; 83/436.9; 83/454; 83/471.2; 83/475; 83/477.2; 83/554; 83/578
(58) Field of Search ............... 83/42, 56, 276, 83/282, 385, 436.9, 454, 471.2, 477.2, 474, 475, 554, 578, 34, 13

(56) References Cited

U.S. PATENT DOCUMENTS

| | | | |
|---|---|---|---|
| 2,772,528 A | * 12/1956 | Else ...................... 83/471.2 X |
| 3,141,367 A | * 7/1964 | Keener et al. ............ 83/282 X |
| 3,634,975 A | * 1/1972 | Hensley ................ 83/471.2 X |
| 4,088,049 A | * 5/1978 | Benedict ............... 83/471.2 X |
| 4,175,458 A | * 11/1979 | Paris, Jr. et al. .......... 83/282 X |
| 4,554,851 A | * 11/1985 | Elhaus ................. 83/471.2 X |
| 4,660,449 A | * 4/1987 | Le Tarte ................ 83/282 X |
| 5,009,137 A | * 4/1991 | Dannatt ................ 83/471.2 X |
| 5,088,364 A | * 2/1992 | Stolzer ................. 83/282 X |
| 5,101,703 A | * 4/1992 | Tanaka et al. ........... 83/282 X |
| 5,303,755 A | * 4/1994 | Poling ................. 83/477.2 X |
| 5,315,906 A | * 5/1994 | Ferenczi et al. .......... 83/282 X |
| 6,116,126 A | * 9/2000 | Van Den Bulcke et al. ................... 83/282 X |

* cited by examiner

Primary Examiner—Charles Goodman
(74) Attorney, Agent, or Firm—Bachman & LaPointe, P.C.

(57) ABSTRACT

In a method for cutting at least one workpiece section (1), in particular aluminum section, which may have been produced in an extrusion press, using a sawing device (19) which, on a frame (5), is displaced along an X-axis above a conveyor device (2) for workpiece sections (1), a saw (13) is displaced with respect to the sawing device (19, 25) in an X-direction and/or Y-direction above the conveyor device (2) for workpiece sections (1), in order to cut at least one workpiece section (1), at least one saw bench (15) is moved into a conveyor plane (20) of the conveyor device (2) for workpiece sections (1), the at least one workpiece section (1) then being moved in via the at least one saw bench (15) and then being cut through.

13 Claims, 3 Drawing Sheets

METHOD FOR CUTTING AT LEAST ONE WORKPIECE SECTION WHICH MAY HAVE BEEN PRODUCED IN AN EXTRUSION PRESS

This is a Continuation, of application Ser. No. 09/281,724 filed Mar. 30, 1999.

BACKGROUND OF THE INVENTION

The present invention relates to a method for cutting at least one workpiece section, in particular aluminum section, which may have been produced in an extrusion press, using a sawing device which, on a frame, is displaced along an X-axis above a conveyor device for workpiece sections, a saw being displaced with respect to the sawing device in an X-direction and/or Y-direction above the conveyor device for workpiece sections, and to a device for carrying out the method.

A wide variety of forms and designs of such methods and devices are known in the prior art. They are primarily used to cut, for example, workpiece sections which have been produced in extrusion presses to length.

Nowadays, modern extrusion presses are able to produce large numbers of workpiece sections extremely quickly. Conventional sawing devices are unable to keep up with the rapid production of workpiece sections in extrusion presses when cutting through the workpiece sections.

A suitable sawing device is connected downstream of a conventional conveyor device. Between extrusion and cutting of the workpiece sections, the latter may pass through various other processes.

A drawback of methods and devices of this nature which are currently known is that to date workpiece sections have been sawn and, in particular, cut through much too slowly. Modern extrusion presses are considerably faster than such devices for cutting workpiece sections to length. Therefore, the workpiece sections are removed from the conveyor devices and are later sawed to length on separate belts, which represents an expensive and undesirable operation.

A further drawback is that precise sawing and exact cutting to length are not possible. If extruded sections which have been cut to length in the correct dimensions were available, manufacturers of certain desired workpiece sections could save additional process costs. In addition, it is also intended for it to be possible for the workpiece sections coming from the belt to be directly cut to length into short pieces.

SUMMARY OF THE INVENTION

This object is achieved by the fact that in order to cut at least one workpiece section, at least one saw bench is moved into a conveyor plane of the conveyor device for workpiece sections, the at least one workpiece section then being moved in via the at least one saw bench and then being cut through.

By means of the present invention, a sawing device which can be displaced via a framework element above a conveyor device along a frame can be positioned in a very simple and rapid manner. The sawing device can be displaced in the conveying direction of the conveyor device along preferably ground guide rails between the framework element on which the sawing device is arranged. Drive motors can accurately control and direct a sawing device of this nature.

The sawing device can be displaced in two axes on the framework element. It can be lowered and can be displaced transversely to the conveyor device, and, in particular, transversely to the conveying direction of a workpiece section.

However, the essential feature of the present invention is that a saw bench is moved into the conveyor device as a result of the conveying-roller elements of this device giving way and moving downward. Then, a workpiece section, or even a plurality of workpiece sections, can be moved over the saw bench by being conveyed onward by means of the conveyor device. When the workpiece section has reached a stop, a blank holder, which is preferably provided on the guide columns assigned to the framework element, can be moved downward onto the workpiece section. By means of the blank holder, the workpiece section can be clamped in place with respect to the saw bench which has been lowered into the conveyor device. Subsequently, the saw can be moved downward and the workpiece section cut through in a very precise manner.

For this purpose, it is advantageous if a suitable groove is provided in the saw bench. This groove can be dispensed with, for example, if the saw blade of the saw cuts through the workpiece section outside the bench.

In a further preferred exemplary embodiment of the present invention, a sawing device is mounted on a holding element in such a manner that it can pivot about a pivot point. Radial pivoting allows the saw to be advanced in or in the opposite direction to a Y-direction of the saw. At the same time, the sawing device can be moved back and forth in the X-direction on the holding element. Pivoting the saw in or pivoting it about an at-rest position results in a radial rotation and therefore in the saw being advanced into the workpiece section. A subsequent displacement in the X-direction results in workpiece sections which are clamped in a blank holder of a saw bench being cut through. After they have been cut through, the return movement of the sawing device in the opposite direction to an X-direction and simultaneous rotation about the pivot point can take place at the same time, in order to pivot the saw, in particular its blade, out of the saw bench.

When the saw blade has been pivoted out, the workpiece section which has been cut to length can immediately be moved out and the next section can be moved in. In this way, it is possible to save considerable manufacturing costs relating to the accurate, precise and rapid cutting.

Furthermore, it is advantageous in the present invention for a plurality of sawing devices which are arranged movably, by means of one framework element each, on a frame above the conveyor device, to cut a workpiece section into a plurality of parts at the same time or at offset intervals. In this case, it is possible to precisely determine the length of individual parts between, for example, two sawing devices.

As a result, a single workpiece section can be divided into any appropriate number of desired parts, for example by providing a plurality of sawing devices, in one operation. This can take place very quickly.

BRIEF DESCRIPTION OF THE DRAWINGS

Further advantages, features and details of the invention will emerge from the following description of preferred exemplary embodiments and with references to the drawings, in which.

DETAILED DESCRIPTION OF PREFERRED EMBODIMENTS

Figure 1:
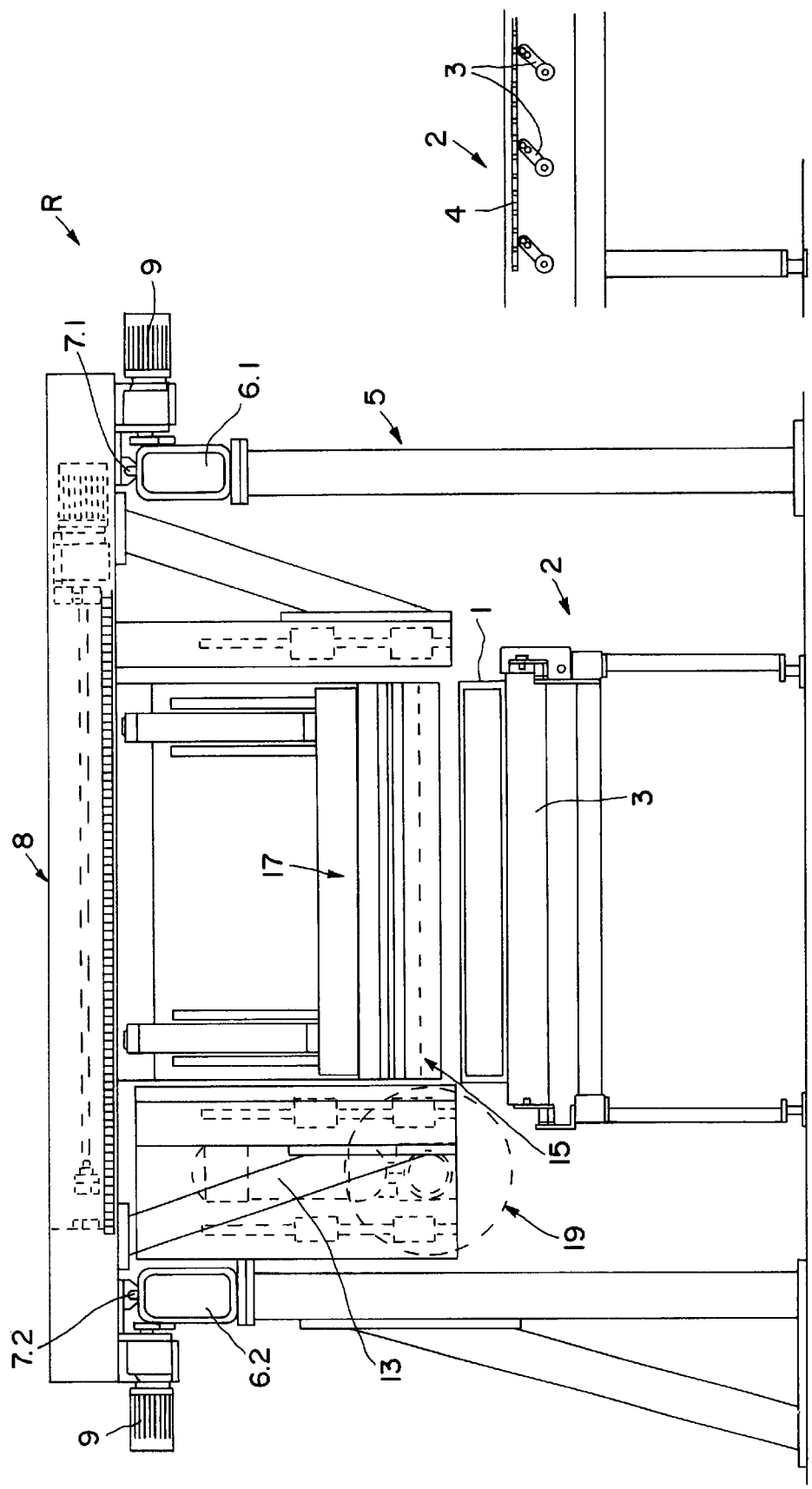
FIG. 1a shows a diagrammatic cross section through a device according to the invention for cutting at least one workpiece section.
FIG. 1b shows at least part of a simplified side view of a conveyor device which is assigned to the device in accordance with FIG. 1.

In accordance with FIGS. 1a and 1b, a device R according to the invention for cutting workpiece sections 1 has a conveyor device 2, in order to feed workpiece sections 1 from an extrusion press (not shown here), which acts as a series feed device, to a downstream saw with a length stop.

No further details need be provided with regard to the extrusion of workpiece sections 1, a subsequent transverse conveying and cooling of the workpiece sections 1, in particular extruded sections, in the cooling bed, and any after-treatment which follows. The conveyor device 2 is designed as a saw feeder for the workpiece section 1. This conveyor device 2 is of conventional nature and has a plurality of conveying-roller elements 3 which are driven by means of a drive 4, cf. FIG. 1b, in order to convey the workpiece section 1.

Figure 2:
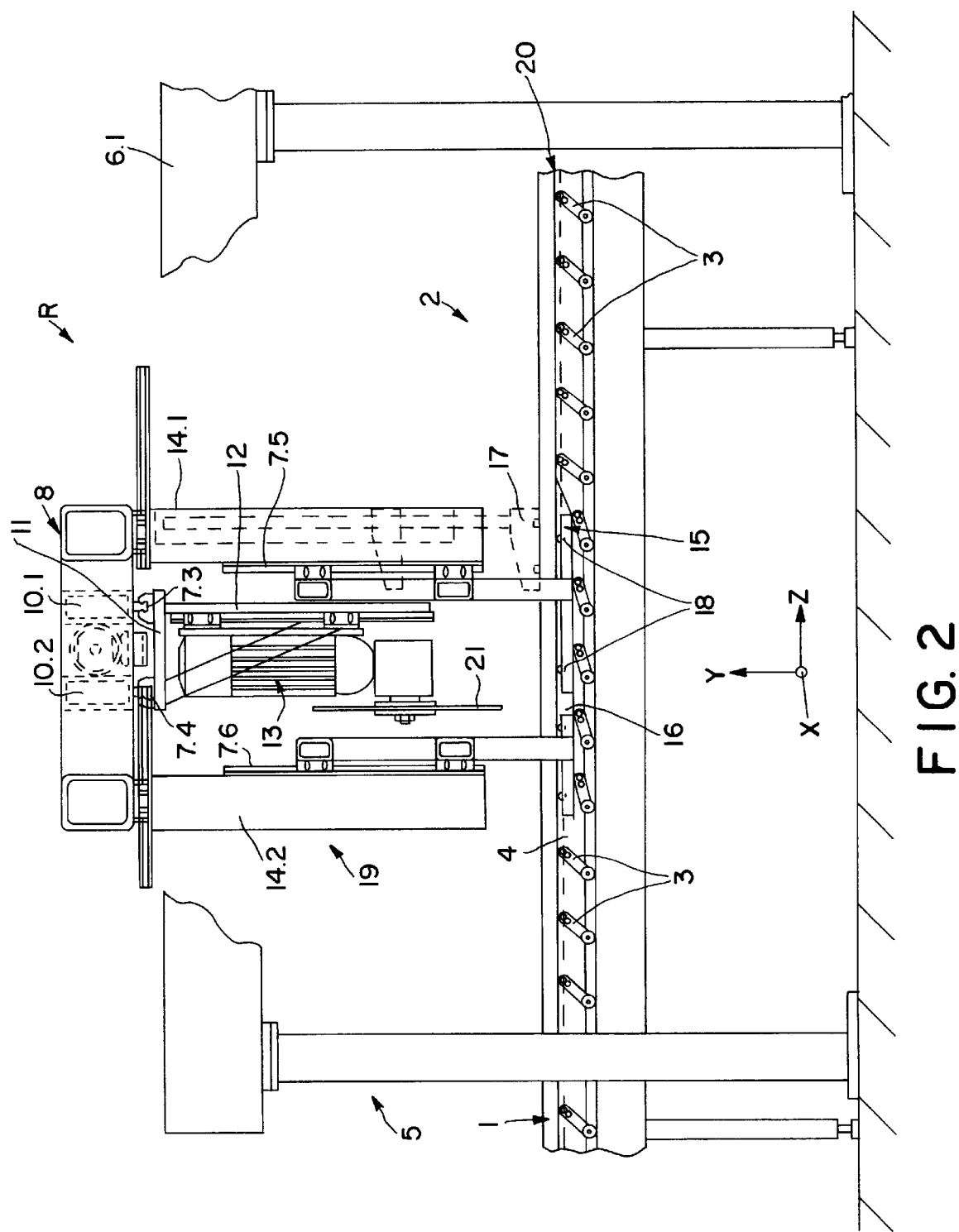
FIG. 2 shows a diagrammatic side view of the device in accordance with FIG. 1a in a different position of use.

The particular feature of the conveying-roller elements 3 is that when pressure is applied, as shown in particular in FIG. 2, they can be folded away downward, in an articulated manner, via lever elements which are not provided with a reference numeral in this description. In this case, the conveying-roller elements 3 are prestressed, for example by means of a spring, so that a certain pressure is required in order to move them downward. Preferably, all the conveying-roller elements 3 of the conveyor device 2 can be folded or pivoted away downward in a sawing area.

If a conveying-roller element 3 is pivoted away downward, it is decoupled from the drive 4. In FIG. 2, the drive 4 is shown as a chain indicated by dashed lines. In this way, the individual conveying-roller elements can be separated from the drive 4 by applying pressure and moving them downward.

As shown in FIGS. 1a and 2, the conveyor device 2 is arranged so that it can move in a coordinate direction Z.

Furthermore, a frame 5, which is designed to be higher than the conveyor device 2, is provided running in a Z-direction, preferably next to the sides of the conveyor device 2. The frame 5, preferably its portal elements 6.1, 6.2, runs parallel to the conveyor device 2. Guide rails 7.1, 7.2, on which a framework element 8 can be displaced back and forth substantially without play, and in an exact and precise manner, are provided above the portal elements 6.1, 6.2. The drive motors 9 allow the framework element 8 to be moved very precisely into any desired position on the portal elements 6.1, 6.2.

As illustrated by dashed lines in FIG. 2, the framework element 8 is assigned at least one saw-holding framework 10.1, 10.2, from which guide rails 7.3, 7.4 project downward. By means of a holding plate 11 and a strut 12 which is preferably perpendicularly connected to this plate, a saw 13 can be displaced back and forth in a vertically adjustable manner, i.e. in a Y-direction. The guide elements or guide rails are not described in more detail here. Furthermore, the saw 13 can be displaced along the guide rails 7.3, 7.4 or along the saw-holding frame 10.1, 10.2, in the X-direction.

However, in the present invention it is advantageous for guide columns 14.1, 14.2 to project downward from the framework element 8, as shown in particular in FIG. 2. According to the invention, at least one saw bench 15 can be displaced on the guide columns via guide rails 7.5, 7.6. The saw bench 15 may be provided with a sawing groove 16.

Furthermore, the framework element 8 or the guide columns 14.1, 14.2 is/are assigned a blank holder 17 which can be displaced in the Y-direction. The function of the blank holder 17 is to be moved onto the workpiece section 1 and to clamp this section with respect to the saw bench 15. In so doing, the blank holder 17 can releasably fix the workpiece section 1 which has been moved into the saw bench 15 in a desired position.

The saw bench 15 may also be provided with roller elements 18, in order to convey a workpiece section 1 which has been moved onward into the saw bench virtually without friction.

The overall result is a sawing device 19 which can be used to move any desired distance, in an adjustable manner, with respect to a stop (not shown here). It is possible to move to cutting locations which are exactly and accurately desired, preferably via ground guide rails 7.1 to 7.4.

A further preferred exemplary embodiment of the present invention shows a device $R_1$ in which a sawing device 125 with saw 113 can be positioned above a conveyor device 102 by means of a frame 105.

In this case, at least one saw-holding framework 110.1, 110.2, from which guide rails 107.3, 107.4 project, is mounted on the frame 105, and in particular on its framework element 108, in such a manner that it can be displaced in a Z-direction illustrated along portal elements 106.1, 106.2 on guide rails 107, preferably ground guide rails. In the preferred exemplary embodiment, the portal frameworks 106.1, 106.2 are arranged considerably closer together than in the exemplary embodiment shown in FIGS. 1a and 1b. They are suspended or arranged directly from or on the framework element 108 of the frame 105, approximately centrally above the conveyor device 102.

A further difference between this exemplary embodiment and those mentioned above is that the sawing device 125, together with saw 113, can be displaced back and forth in the X-direction illustrated along a holding element 126 which is preferably arranged horizontally. The holding element 126 is connected to the saw-holding framework 110.1, 110.2. It is also intended for displacement to be as accurate as possible and for the cutting to be as precise as possible. Not only is the saw 113 connected to the holding element 126 and arranged so that it can be displaced in the X-direction, but also the holding element 126 is connected via guide columns 114 to the saw bench 115 and its blank holder 117. These components are actuated in the manner described above.

Figure 3:
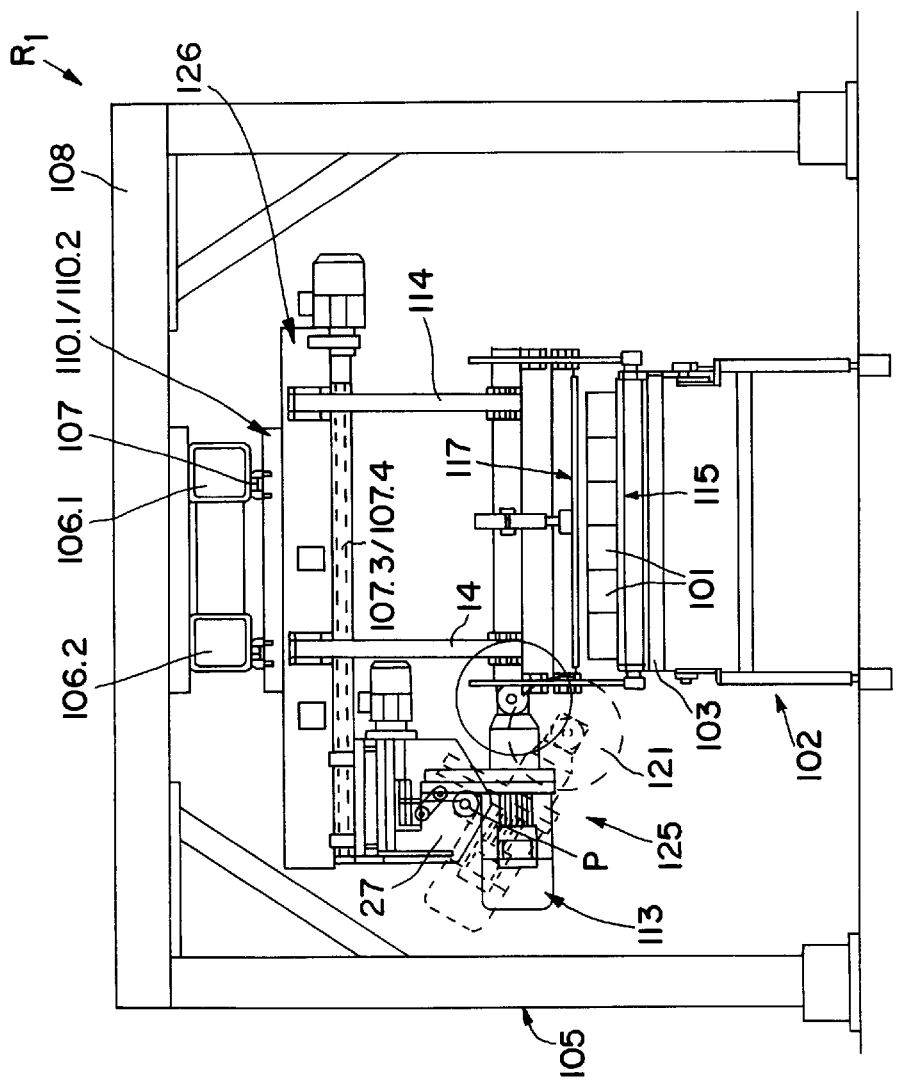
FIG. 3 shows a diagrammatic cross section through a further exemplary embodiment of the device for cutting at least one workpiece section.

However, an essential factor here is that the sawing device 125 is arranged horizontally in an at-rest position, as indicated in FIG. 3.

If a workpiece section 101 or a plurality of workpiece sections 101 are to be cut through in the saw bench 115, the sawing device 125, which is mounted on the holding element 126 by means of a saw arm 127, is pivoted downward about a pivot point P, so that the saw blade 121 is pivoted downward. This takes place outside the saw bench 115, as shown in particular by FIG. 3. Then, by displacing the sawing device 125 in the X-direction, the at least one workpiece section 101, which is clamped in the manner described above, is cut through, the sawing device 125 being displaced through a sawing groove (not shown) and then, after the workpiece sections 101 have been completely cut through, being pivoted back into a horizontal position about the pivot point P. Even while the saw 113 is being pivoted back into the horizontal position, the saw arm 127, and in particular the saw 113, can be moved back into their starting, at-rest position. This increases the speed with which the workpiece sections are cut through, since this return movement and pivoting can take place considerably more quickly.

Furthermore, a linear movement of the sawing device in the X-direction is all that is then required. The feed movement is carried out by pivoting the saw 113 about the pivot point P. In this way, the saw blade 121 can be guided into the workpiece section 101, in particular into the extruded section, and thus can cut through this section in a very simple, inexpensive manner, without long displacement distances. This makes it possible to save additional costs and time.

Figure 4:
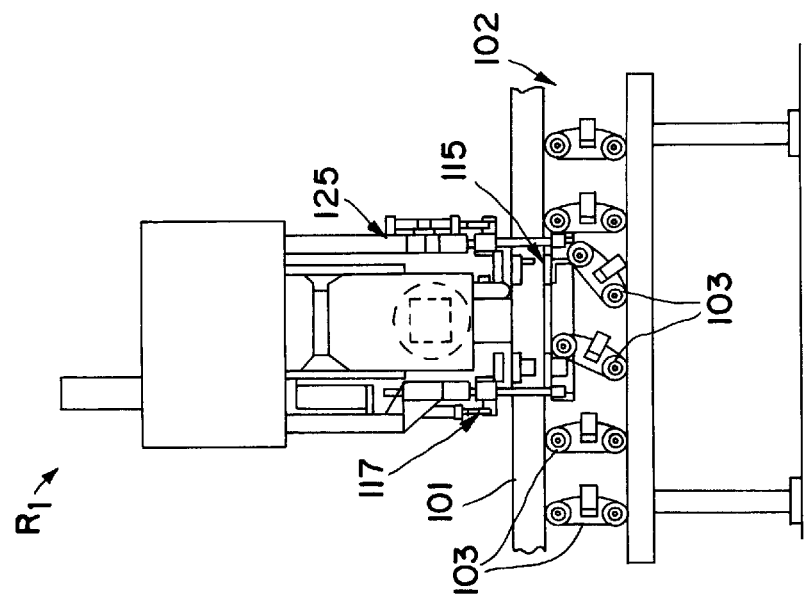
FIG. 4 shows a diagrammatic side view of the device in accordance with FIG. 3 in a possible position of use.

The exemplary embodiment in accordance with FIG. 4 illustrates how the saw bench 115 presses the individual conveying-roller elements 103 downward in the manner described above, in order to move the workpiece sections 101 into the saw bench and then to fix them there by means of the blank holder 117. Cutting then takes place in the manner described above.

The present invention operates as follows, referring to FIGS. 1–2:

The sawing device 19 is aligned with respect to a stop (not shown here) or in accordance with a defined or desired length of the workpiece section 1. Then, the saw bench 15 is moved into a conveyor plane 20 of the conveyor device 2 and applies pressure to the conveying-roller elements 3 which lie beneath it until they give way under the pressure of the saw bench 15 which is moving downward. The saw bench 15 is lowered sufficiently far for the workpiece section 1 to be able to move into or over the saw bench 15, as indicated in FIG. 2. The roller elements 18 assist with conveying the workpiece section 1 over the saw bench 15.

The workpiece section 1 is conveyed at least to a specific stop by means of the conveyor device 2. While the conveyor device is conveying the workpiece section 1 onward, the conveying-roller elements 3 which have been forced downward are decoupled from the drive 4. This drive may be brought about, for example, simply by drive gearwheels engaging in a driving chain. By pivoting the conveying-roller elements 3 away, a connection, for example a gearwheel chain, can be interrupted very easily.

When a desired length of the workpiece section 1 or a stop for the workpiece section 1 has been reached, the at least one workpiece section 1 is clamped between blank holder 17 and saw bench 15 by moving the blank holder 17 downward. Then, the saw, as illustrated in FIG. 1a, is displaced downward, in the opposite direction to a Y-direction, a saw blade 21 cutting through the workpiece section 1 by displacing the saw 13 in the X-direction. Then, the saw 13, after it has been moved out of the conveyor-device area and out of the workpiece section 1, is displaced upward in the Y-direction and, above the workpiece section 1, is moved back into the starting position. From there, a further cutting operation can be carried out when a new piece of the workpiece section 1 is again bearing against the saw 13.

In a further exemplary embodiment of the present invention, the sawing device 125 is arranged so that it can pivot about a pivot point P, this pivoting movement, which may be hydraulically controlled, allowing movement into the workpiece section. Then, it is merely necessary to displace the sawing device in the X-direction illustrated in order to cut through the individual workpiece sections 101 which are arranged next to one another. Then, the sawing device 125 is pivoted out and moved back, if appropriate at the same time, in the opposite direction to the X-direction illustrated. It is pivoted out by rotating the saw 113 into its at-rest position, which is preferably arranged horizontally. Here too, it is important that the sawing device 125 can be displaced downward while still outside the conveyor device 102, so that a sawing process can begin immediately after the workpiece sections 1 have been put in place. The fact that the sawing device is pivoted out and displaced back simultaneously also saves considerable time in cutting through workpiece sections 101.

A further important factor in the present invention is that a plurality of sawing device 19, 125, via a plurality of framework elements on the frame or portal elements can cut through a workpiece section simultaneously or successively. It is preferable for these sawing devices to work simultaneously, in order in this way to save on very high waiting times when cutting through workpiece sections.

It is also advantageous that each device R, $R_1$ or each sawing device 19, 125 can cut through the workpiece section at any desired position on the frame or portal element. A plurality of sawing devices 19, 125 are synchronously able to cut very long workpiece sections into a large number of individual sections of equal or different lengths. This makes it possible to reduce considerable manufacturing costs when extruding extruded sections. Also, so-called sweat mark scrap which is found in an extruded section can in this way be removed very easily.

A novel sawing device of this nature is extremely quick and very precise, so that the workpiece sections can be accurately cut to the desired length, as desired by a customer, for example, immediately after extrusion. There is no need for subsequent reworking or further cutting to length.

What is claimed is:

1. A method for cutting at least one workpiece, which comprises:

providing a conveyor device for at least one workpiece;

providing a sawing device on a frame adjacent said conveyor device and displacing said sawing device along an X direction above and substantially parallel to said conveyor device;

providing a saw for said workpiece above said conveyor device and displacing said saw with respect to the sawing device in at least one of said X direction and a Y direction essentially perpendicular to said X direction;

moving at least one saw bench into a conveyor plane of the conveyor device in order to cut said workpiece, wherein said workpiece is moved into the conveyor plane via said at least one saw bench for cutting via said saw;

applying pressure to the workpiece and clamping said workpiece against the saw bench via at least one blank holder before the workpiece is cut;

including the step of providing conveyor roller elements below the saw bench driven by means of a drive, lowering the saw bench into the conveyor device and lowering the conveyor roller elements below the saw bench, and conveying the workpiece over the saw bench;

wherein by lowering the saw bench into the conveyor device the drive of the lowered conveyor roller elements is decoupled in this area.

2. The method according to claim 1, wherein the sawing device is displaced on said frame in order to position the saw before lowering the saw bench, and moving said saw to a workpiece cutting length at a reference point.

3. The method according to claim 1, wherein after the workpiece has been secured by means of said blank holder and the saw bench, the sawing device is lowered next to the conveyor device in a direction opposite to said Y direction, then is displaced through the workpiece in the X direction, thus cutting through the workpiece, and moving the saw out of the workpiece along the Y direction and then displacing said saw into a starting position by moving said saw in the X direction.

4. The method according to claim 1, including moving the sawing device into and out of the workpiece in at least one of a linear fashion and by pivoting about a pivot point.

5. The method according to claim 4, wherein the saw is radially pivoted about a pivoting point out of a horizontal position into a position which is inclined downward, before start of sawing, and then the saw is moved in a linear fashion in the X direction through the workpiece and, after the workpiece has been cut through, the saw is pivoted and at the same time moved in a direction opposite to said X direction.

6. The method according to claim 1, wherein said workpiece is cut into a plurality of part sections by means of a plurality of said sawing devices which are arranged displaceably on said frame.

7. The method according to claim 1, wherein the conveyor roller elements of the conveyor device are pivoted below the saw bench.

8. The method according to claim 1, including providing said frame with at least one portal element on which a framework element for holding the sawing device is displaced on guide rails.

9. The method according to claim 8, wherein the framework element is displaced along the portal elements on the frame in and opposite to a conveying direction of the workpiece.

10. The method according to claim 9, including at least one saw holding framework of the framework element which is transverse to the conveying direction, and displacing said saw back and forth in said X direction along a guide rail.

11. The method according to claim 10, wherein the saw is displaced in said Y direction along a guide rail.

12. The method according to claim 8, wherein the framework element is assigned guide columns which project downward and on which the saw bench together with a saw blade groove is displaced in the Y direction.

13. The method according to claim 12, wherein at least one of said guide columns is assigned at least one blank holder which is displaced in the Y direction.

* * * * *